United States Patent
Sato

(10) Patent No.: US 10,549,582 B2
(45) Date of Patent: Feb. 4, 2020

(54) PNEUMATIC TIRE

(71) Applicant: TOYO TIRE & RUBBER CO., LTD., Osaka-shi, Osaka (JP)

(72) Inventor: Yoshiki Sato, Osaka (JP)

(73) Assignee: TOYO TIRE CORPORATION, Itami-shi, Hyogo (JP)

( * ) Notice: Subject to any disclaimer, the term of this patent is extended or adjusted under 35 U.S.C. 154(b) by 497 days.

(21) Appl. No.: 15/294,233

(22) Filed: Oct. 14, 2016

(65) Prior Publication Data
US 2017/0120689 A1     May 4, 2017

(30) Foreign Application Priority Data

Oct. 30, 2015   (JP) ................. 2015-214914

(51) Int. Cl.
| | |
|---|---|
| *B60C 11/01* | (2006.01) |
| *B60C 13/02* | (2006.01) |
| *B60C 11/13* | (2006.01) |
| *B60C 11/03* | (2006.01) |
| *B60C 11/12* | (2006.01) |

(52) U.S. Cl.
CPC .......... *B60C 11/1353* (2013.01); *B60C 11/01* (2013.01); *B60C 11/0302* (2013.01); *B60C 11/1236* (2013.01); *B60C 13/02* (2013.01); *B60C 2011/013* (2013.01); *B60C 2011/0358* (2013.01); *B60C 2011/1361* (2013.01)

(58) Field of Classification Search
CPC . B60C 11/01; B60C 11/0302; B60C 11/1353; B60C 2011/013; B60C 2011/1361; B60C 13/02
See application file for complete search history.

(56) References Cited

U.S. PATENT DOCUMENTS

| | | | |
|---|---|---|---|
| 6,109,317 A * | 8/2000 | Iwamura | B60C 11/0302 152/209.18 |
| 2008/0210355 A1* | 9/2008 | Harvey | B60C 11/01 152/209.8 |
| 2011/0120609 A1* | 5/2011 | Nakamura | B60C 11/0302 152/209.18 |

(Continued)

FOREIGN PATENT DOCUMENTS

| | | |
|---|---|---|
| JP | 2-53607 A | 2/1990 |
| JP | 06-024211 A * | 2/1994 |

(Continued)

OTHER PUBLICATIONS

Machine translation for Japan 2003-205709 (Year: 2018).*

(Continued)

*Primary Examiner* — Steven D Maki
(74) *Attorney, Agent, or Firm* — Westerman, Hattori, Daniels & Adrian, LLP

(57) ABSTRACT

There is provided a pneumatic tire which exhibits excellent durability while improving driving comfort. A pneumatic tire includes: a buttress portion; and a plurality of circumferential grooves formed on the buttress portion and extending in a tire circumferential direction. A ridge extending in the tire circumferential direction is formed in each of the plurality of circumferential grooves. A length of the ridge is not smaller than 50% of a length of the circumferential groove in the tire circumferential direction.

5 Claims, 6 Drawing Sheets

(56) References Cited

U.S. PATENT DOCUMENTS

2017/0120690 A1* 5/2017 Takahashi ........... B60C 11/0302

FOREIGN PATENT DOCUMENTS

| JP | 2001-225609 A | | 8/2001 |
|---|---|---|---|
| JP | 2003-205709 A | * | 7/2003 |
| JP | 2005-81919 A | | 3/2005 |
| JP | 2006-256433 A | | 9/2006 |
| JP | 2010-132045 A | | 6/2010 |
| JP | 2013-151235 A | | 8/2013 |

OTHER PUBLICATIONS

Machine translation for Japan 06-024211 (Year: 2018).*
Office Action dated Jan. 25, 2018, issued in counterpart Chinese Application No. 201610898375.3, with English translation. (11 pages).
Office Action dated May 14, 2019, issued in counterpart JP Application No. 2015-214914, with English translation. (7 pages).

* cited by examiner

TIRE CIRCUMFERENTIAL DIRECTION

STEPPING-IN SIDE ⟵⟶ KICKING-OUT SIDE

PNEUMATIC TIRE

CROSS-REFERENCE TO RELATED APPLICATIONS

This application claims priority of Japanese Patent Application No.: 2015-214914 filed on Oct. 30, 2015, the content of which is incorporated herein by reference.

BACKGROUND OF THE INVENTION

Technical Field

The present invention relates to a pneumatic tire.

Related Art

Conventionally, as a pneumatic tire, there has been known a pneumatic tire which is configured such that a plurality of concavo-convex portions each of which is formed of a first inclined surface and a second inclined surface are formed on a buttress portion (see JP 2010-132045 A).

As another pneumatic tire, there has been known a pneumatic tire which is configured such that a ridge-shaped protector extending in a tire circumferential direction is formed on a buttress portion (see JP 2006-256433 A).

As still another pneumatic tire, there has been known a pneumatic tire which has a plurality of circumferential grooves extending along a tire equator (see JP 2001-225609 A).

SUMMARY

However, none of these configurations aim at the improvement of driving comfort. Further, the pneumatic tires described in JP 2010-132045 A and JP 2006-256433 A are not characterized by a groove shape but are characterized by a surface shape. The pneumatic tire described in JP 2001-225609 A is not configured to prevent a drawback caused by a groove shape, that is, the occurrence of cracks due to the deterioration with time by forming deep grooves.

It is an object of the present invention to provide a pneumatic tire which exhibits excellent durability while improving driving comfort.

To overcome the above-mentioned drawback, according to an aspect of the present invention, there is provided a pneumatic tire including: a buttress portion; and a plurality of circumferential grooves formed on the buttress portion and extending in a tire circumferential direction, wherein a ridge extending in the tire circumferential direction is formed in each of the plurality of circumferential grooves, and wherein a length of the ridge is not smaller than 50% of a length of the circumferential groove in the tire circumferential direction.

With such a configuration, the pneumatic tire absorbs the deformation of tread due to the circumferential groove when traveling on a road surface having unevenness thus improving driving comfort. Further, the ridge formed in the circumferential-direction groove alleviates stress concentration caused by the deformation of the circumferential-direction groove and hence, the pneumatic tire exhibits desired durability.

The ridges may preferably have no overlapping region in a state where the ridges are projected in a tire width direction.

With such a configuration, a large change in rigidity of the pneumatic tire in the tire circumferential direction can be eliminated.

The ridge may preferably be inclined with respect to the tire circumferential direction.

With such a configuration, the ridges are not positioned on the same circumference in the tire circumferential direction and hence, the stress concentration can be prevented whereby the pneumatic tire can acquire excellent durability.

A plurality of shoulder blocks may preferably be formed on the buttress portion by lateral grooves extending in the tire width direction, and the ridge may preferably be formed over at least the lateral grooves disposed next to each other in the tire circumferential direction.

With such a configuration, durability of the pneumatic tire can be enhanced by increasing rigidity of the pneumatic tire in the tire circumferential direction.

The ridges may preferably have different transverse cross-sectional areas in the tire circumferential direction.

With such a configuration, the stress concentration in the ridge in the tire circumferential direction can be alleviated and hence, the durability of the pneumatic tire can be enhanced.

The ridge may preferably have a triangular shape in cross section, and an apex of the triangular cross section may preferably be positioned coplanar with a surface of the buttress portion.

With such a configuration, it is possible to acquire a state substantially equal to a state where the circumferential grooves are formed in two rows at least in not smaller than 50% of a circumference in the tire circumferential direction. With such a configuration, it is possible to increase rigidity of the pneumatic tire while avoiding a phenomenon where the ridges project from a surface of the buttress portion so that the ridges are liable to be damaged.

According to the present invention, the ridge is formed in the circumferential-direction groove and hence, the durability of the pneumatic tire can be enhanced while improving driving comfort.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Hereinafter, an embodiment of the present invention is described with reference to the attached drawings. The description made hereinafter is provided substantially for merely exemplifying the present invention, and the description does not intend to limit the present invention, a product to which the present invention is applied or applications of the present invention.

Figure 1:
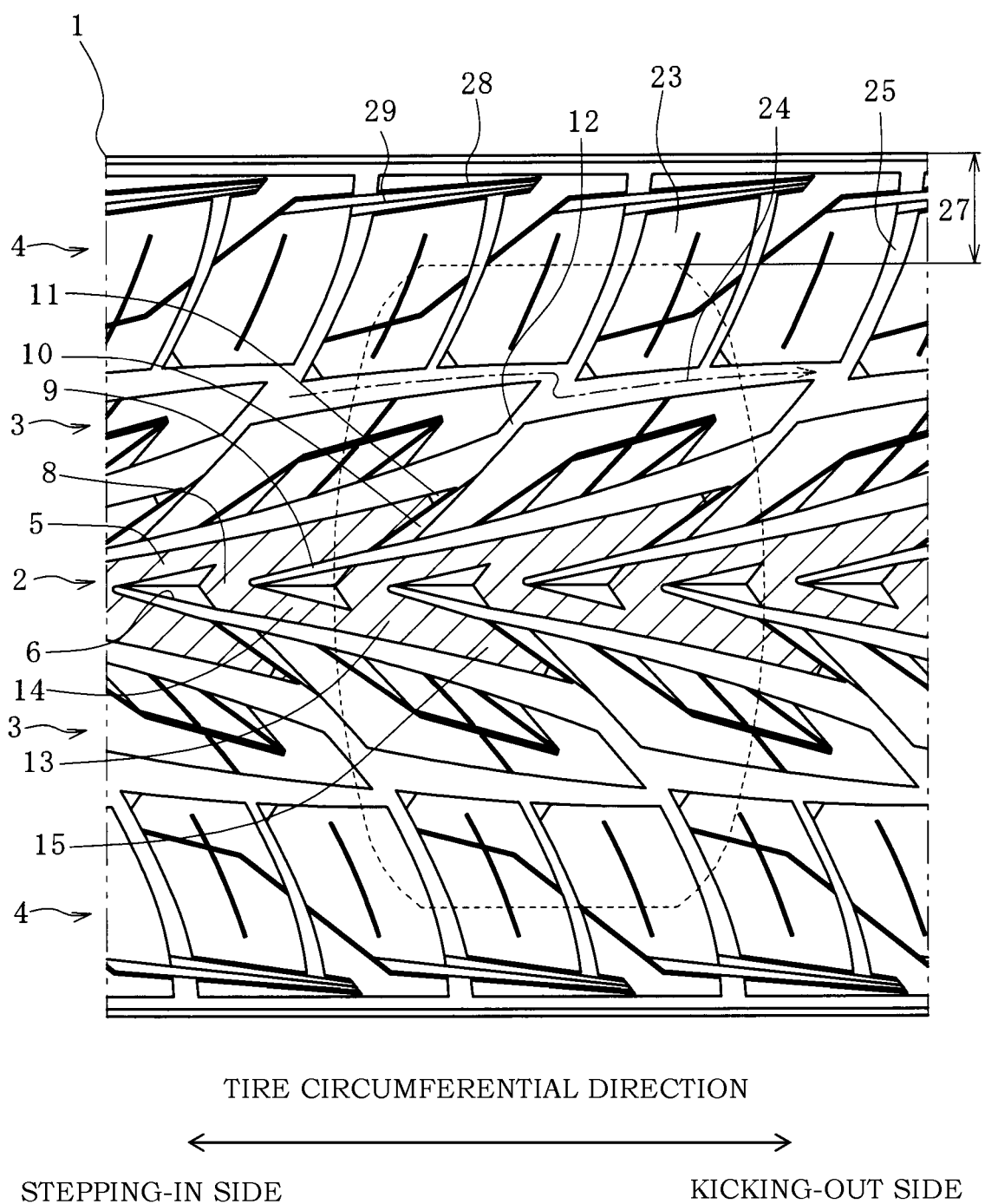
FIG. 1 is a developed view showing a portion of a tread portion of a pneumatic tire according to this embodiment.

FIG. 1 is a developed view showing a tread portion 1 of a pneumatic tire according to this embodiment. Although not shown in the drawing, the pneumatic tire is configured such that a carcass is extended between a pair of bead cores, an intermediate portion of the carcass is reinforced by a belt wound around an outer peripheral side of the intermediate portion of the carcass, and the pneumatic tire has the tread portion 1 outside the carcass in the tire radial direction. The tread portion 1 is formed of: a center region 2 which is formed at a center portion of the tread portion 1 in the tire width direction; mediate regions 3 disposed on both sides of the center region 2; and shoulder regions 4 disposed on both sides of the tread portion 1.

A rib 5 (indicated by a solid hatched lines in FIG. 1) continuously extending in the tire circumferential direction is formed at the center region 2. A plurality of recessed portions 6 are formed in the rib 5 at predetermined intervals along the tire circumferential direction. Each recessed portion 6 is, as viewed in a developed view, formed into an arrowhead shape where a width of the recessed portion 6 is gradually increased toward the other end (kicking-out) side of the recessed portion 6 from an apex of the recessed portion 6 on one end (stepping-in) side in the tire circumferential direction.

Figure 2:
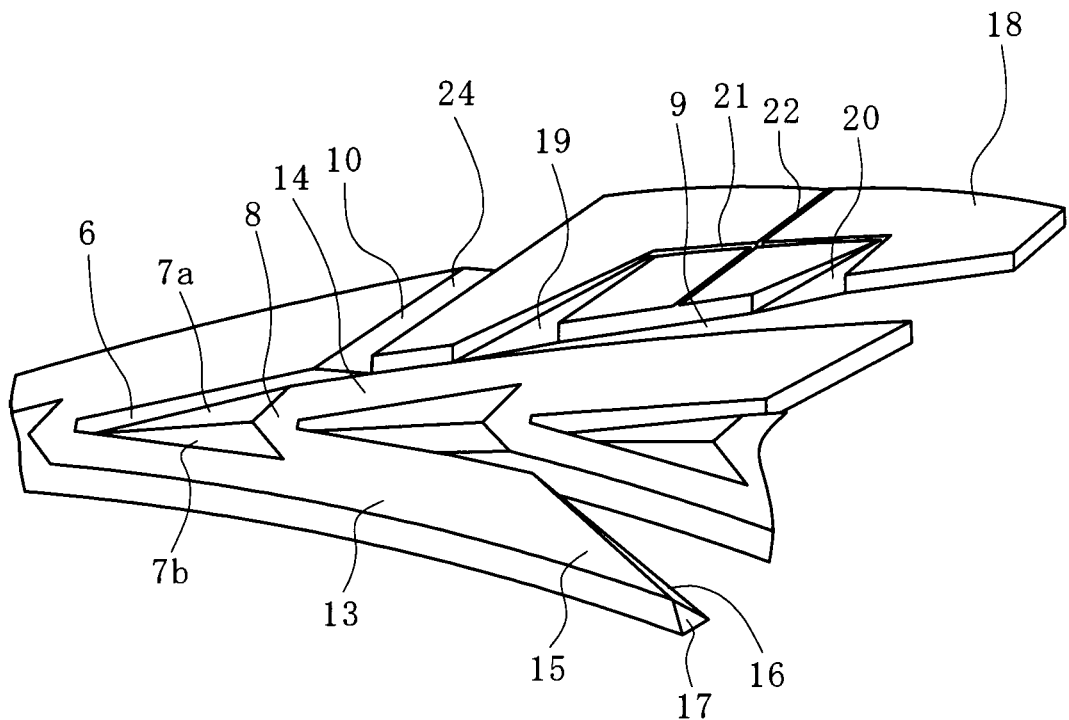
FIG. 2 is a partial enlarged perspective view of a portion shown in FIG. 1.
Figure 3:
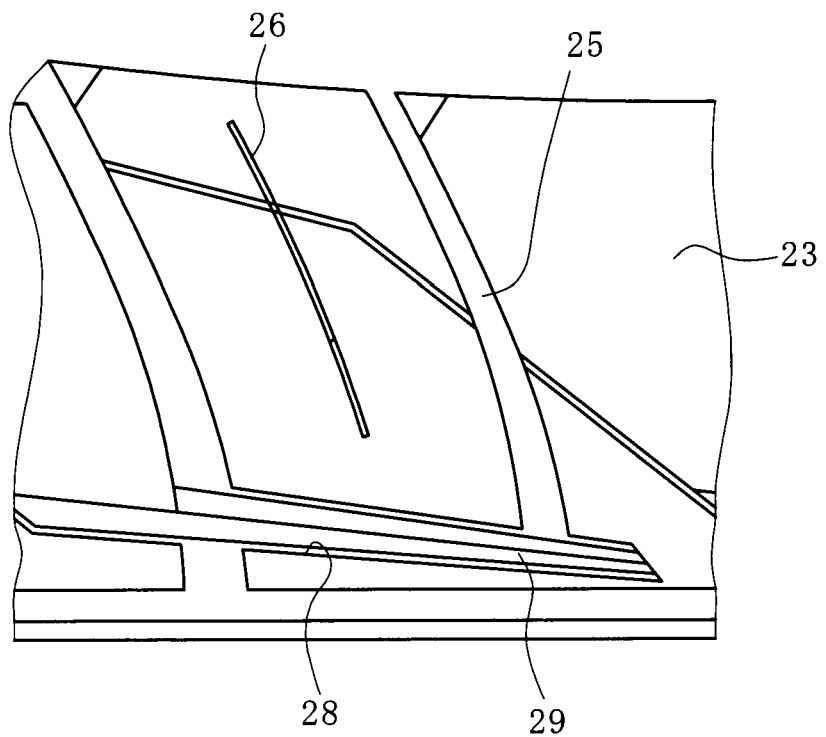
FIG. 3 is a partial enlarged view of a shoulder portion shown in FIG. 1.

To describe the pneumatic tire also with reference to FIG. 2, a bottom surface of the recessed portion 6 is formed of inclined surfaces 7a, 7b disposed on both sides with a center line of the tire interposed therebetween. Portions corresponding to a hypotenuses of the inclined surfaces 7a, 7b (inclined portion) have a largest width, and the center line gradually approaches the tread surface as the center line extends toward the kicking-out side of the recessed portion 6. With such a configuration, water recovered to the recessed portions 6 can be drained in such a manner that water is smoothly distributed to left and right sides by the pair of inclined surfaces 7a, 7b.

Opening end edge portions of the recessed portion 6 on the kicking-out side gradually extend in the tire width direction respectively from the center line toward the kicking-out side in the tire circumferential direction so as to form an approximately V shape. With such a configuration, a distal end portion 8 which is pointed toward an apex side of the neighboring recessed portion 6 in the tire circumferential direction is formed. That is, the distal end portion 8 which increases a width thereof from a stepping-in side to a kicking-out side in the tire circumferential direction is formed. The distal end portion 8 plays a role of enhancing drain property by forcibly dividing water on a road surface in left and right directions at the time when the tire is brought into contact with a road surface.

A groove portion (sub main groove 9) is formed along one inclined portion of each recessed portion 6. The sub main groove 9 extends obliquely toward a kicking-out side in the tire circumferential direction and in the tire width direction while extending beyond the recessed portion 6. The extending direction of the sub main groove 9 from the recessed portion 6 is set just opposite with respect to the tire center line between the recessed portions 6 arranged adjacently to each other in the tire circumferential direction. That is, with respect to the sub main grooves 6 which extend from the respective recessed portions 6 sequentially arranged in a row in the tire circumferential direction, the extending directions of the sub main grooves 9 alternately change between one side (right side) and the other side (left side) in the tire width direction. Further, a width size of each sub main groove 9 is gradually increased in the extending direction of the sub main groove 9. With such a configuration, water which flows into the sub main groove 9 minimally receives a flow resistance so that the water smoothly flows to a kicking-out side from a stepping-in side.

A first lateral groove 10 which extends toward a tire lateral side communicates with each sub main groove 9 in the vicinity of the recessed portion 6, and a terminal end portion of each sub main groove 9 is connected to a main groove 24 described later.

As described later, each first lateral groove 10 is defined by a side surface of the mediate block 18 and a first inclined surface 16 on a rib side. The first lateral groove 10 is formed such that a width size of the first lateral groove 10 is gradually decreased as the first lateral groove 10 extends to a distal end thereof. The first lateral groove 10 communicates with a terminal end part of the sub main groove 9 which is arranged adjacently to the first lateral groove 10 in the circumferential direction through a first narrow width portion 11 having the smallest width size. By forming the first lateral grooves 10 branched from the sub main grooves 9, drain property can be enhanced compared to a case where only the sub main grooves 9 are formed on the tread portion 1. Further, by gradually decreasing a width size of the first lateral groove 10, a flow speed of water when water passes through the first narrow width portion 11 can be increased so that an outflow speed of water to a sub main groove side can be increased. Accordingly, it is possible to allow water to flow into each second lateral groove 25 while compensating for the lowering of a flow speed of water which flows through the sub main groove 9 having a gradually increased width size.

In the same manner as the first lateral groove 10, a width size of a rear end portion of each sub main groove 9 is gradually decreased as the rear end portion of each sub main groove 9 extends toward the distal end thereof. The rear end portion of each sub main groove 9 communicates with the main groove 24 through a second narrow width portion 12 having the smallest width size. By gradually decreasing the width size of the rear end portion of the sub main groove 9, it is possible to allow water to flow into the main groove 24 at a high speed. With such a configuration, drain property can be enhanced by accelerating the flow of water in the main groove 24. Further, the position where the rear end portion of the sub main groove 9 and the main groove 24 communicate with each other and the position where the first lateral groove 10 and the sub main groove 9 communicate with each other are disposed substantially on the same straight line. With such a configuration, drain property can be enhanced by further effectively increasing a flow speed.

In this manner, by forming the recessed portions 6, the sub main grooves 9 and the first lateral grooves 10, the rib 5 includes first inclined rib portions 13 and second inclined rib portions 14 which extend toward both sides. The first inclined rib portion 13 includes a triangular portion 15 which has a distal end thereof pointed in a triangular shape by the first lateral groove 10 and the sub main groove 9. The triangular portion 15 includes: the first inclined surface 16 which forms a part of the first lateral groove 10; and a second inclined surface 17 disposed on a main groove 24 side. With such a configuration, rigidity of each triangular portion 15 can be enhanced.

In the mediate region 3, a plurality of mediate blocks 18 are arranged in a row in the tire circumferential direction. Each mediate block 18 is defined by the sub main grooves 9, the first lateral grooves 10 and the main groove 24.

A first tapered portion 19 and a second tapered portion 20 branched from the sub main groove 9 are formed in the mediate block 18. The first tapered portion 19 and the second tapered portion 20 are formed such that a width and a depth are gradually decreased in a direction away from the sub main groove 9. Further, the first tapered portion 19 and the second tapered portion 20 are formed such that a length of the first tapered portion 19 and a length of the second tapered portion 20 in the tire width direction are set to 30% or more of a length of the mediate block 18 in the tire width direction, and a distal end of the first tapered portion 19 and a distal end of the second tapered portion 20 terminate in the mediate block 18. By forming the first tapered portion 19 and the second tapered portion 20 in this manner, the generation of heat from the mediate block 18 at the time of traveling can be suppressed by suppressing the increase of a volume of the mediate block 18 while realizing the large-sizing of the mediate block 18. By making the mediate block 18 large-sized, cornering performance (cornering power: CP) can be enhanced. Further, with the formation of the first tapered portion 19 and the second tapered portion 20, a surface area of the mediate block 18 is increased so that heat dissipation property can be also enhanced.

In the mediate block 18, a distal end of the first tapered portion 19 and a distal end of the second tapered portion 20 are connected to each other through a third tapered portion 21. With the formation of the third tapered portion 21, it is possible to minimally generate heat by suppressing a volume of the mediate block 18 while increasing rigidity of the mediate block 18. At the same time, with the formation of the third tapered portion 21, it is also possible to facilitate heat generation by increasing a surface area of the mediate block 18. That is, endurance of the tire at a high speed can be enhanced.

Further, a sipe 22 is also formed in the mediate block 18 such that the sipe 22 intersects with the second tapered portion 20. In this embodiment, the sipe 22 means a groove having a width size of 1.5 mm or less. The sipe 22 makes the sub main groove 9 and the main groove 24 communicate with each other, and divides the mediate block 18 into two parts in the tire circumferential direction. With the function of the sipe 22, it is possible to suppress the generation of a pattern noise without lowering rigidity of the mediate block 18. That is, in the case where the sipe 22 is not formed in the mediate block 18, although a noise is generated only at the time when an edge of the mediate block 18 on a stepping-in side is brought into contact with a road surface, such a noise is influenced by the whole mediate block 18 thus generating a noise of a low frequency which is uncomfortable for a person. However, with the formation of the sipe 22, the mediate block 18 can be divided into two parts in the tire circumferential direction and hence, a noise generated at the time when the mediate block 18 is brought into contact with a road surface is divided into a plurality of (two) small noises of a relatively high frequency per a block unit. Accordingly, a person does not feel so uncomfortable even when he hears the noise.

In the shoulder region 4, a plurality of shoulder blocks 23 are arranged in a row in the tire circumferential direction. Each shoulder block 23 is defined by the main groove 24 extending in the tire circumferential direction and having a zigzag shape on both sides, and second lateral grooves 25 which extend in the tire width direction so as to intersect with the main groove 24. A narrow groove 26 extending in the tire width direction is formed in a center portion of a front surface of the shoulder block 23.

In a buttress portion 27 of the shoulder block 23, a circumferential groove 28 is formed such that the circumferential groove 28 extends between and over a pair of second lateral grooves 25 arranged next to each other in the tire circumferential direction and makes such pair of second lateral grooves 25 communicate with each other. In this embodiment, the buttress portion 27 means a region from a ground contact end of the tire to a tire maximum width position. A projecting ridge 29 which projects in a crest shape having a triangular shape in cross section is formed on a bottom surface of each circumferential groove 28. A portion of each projecting ridge 29 positioned on the center line and having the largest height is disposed at the same position as a surface of the buttress portion 27. Further, a boundary portion between a bottom surface and a side surface of the recessed portion 6, and boundary portions between the bottom surface of the recessed portion 6 and the inclined surfaces 7a, 7b of the projecting ridge 29 are chamfered. In this manner, the circumferential groove 28 extends between and over the second lateral grooves 25 arranged next to each other in the tire circumferential direction, and the second lateral grooves 25 arranged next to each other in the tire circumferential direction are connected to each other through the circumferential groove 28 on which the projecting ridge 29 is formed. Accordingly, it is possible to increase rigidity of a portion between the shoulder blocks 23 adjacently arranged to each other in the tire circumferential direction.

The circumferential groove 28 are formed in an inclined manner with respect to the tire circumferential direction. Further, the circumferential grooves 28 are formed such that a width of each circumferential groove 28 is gradually decreased as the circumferential groove 28 extends in the inclined direction. In this manner, the circumferential grooves 28 are not positioned on the same circumference in the tire circumferential direction and hence, it is possible to prevent the stress concentration whereby occurrence of cracks or the like can be prevented.

The circumferential grooves arranged next to each other in the tire circumferential direction are arranged so as not to overlap with each other as viewed in the tire width direction. When the circumferential grooves 28 partially overlap with each other, a change in rigidity is increased. To prevent such a change in rigidity, the circumferential grooves are arranged next to each other in the tire circumferential direction.

When a pneumatic tire provided with the tread portion 1 having the above-mentioned constitution travels a road surface, a range where the tire is brought into contact with a ground at a certain moment is a range surrounded by a dotted line in FIG. 1. That is, a portion of the center region 2, portions of the mediate regions 3 and portions of the shoulder regions 4 fall within the range where the tire is brought into contact with ground. The rib 5 is continuously formed in the center region 2 in the tire circumferential direction. Accordingly, although the rib 5 is configured to include the first inclined rib portions 13 and the second inclined rib portions 14 branched in the left and right directions, the tire has high rigidity, and exhibits favorable road surface followability and favorable braking performance.

Further, the bottom surface of the recessed portion 6 is formed of a pair of inclined surfaces 7 each of which has a depth gradually increased toward a lateral side with respect to the center line of the rib 5 and hence, drain property can be enhanced. Water which enters the center region 2 are made to flow in the left and right directions with certainty by the inclined surfaces 7. Accordingly, it is possible to lead water to the main grooves 24 with certainty by the sub main grooves 9.

The present invention is not limited to the configuration described in the embodiment, and various modifications are conceivable.

Figure 5:
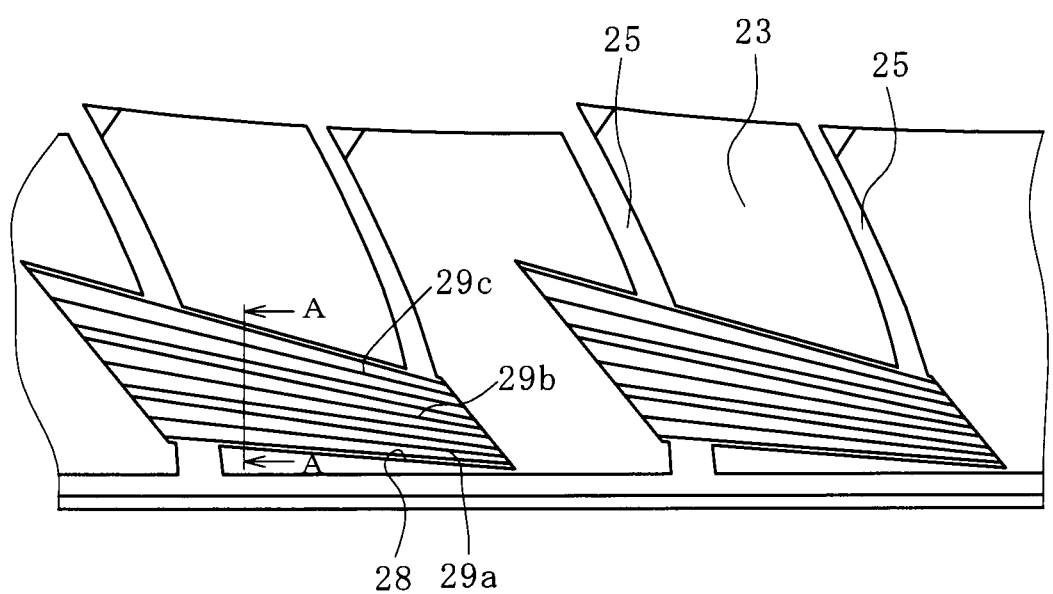
FIG. 5 is a partial enlarged view of a shoulder portion according to another embodiment.
Figure 6:
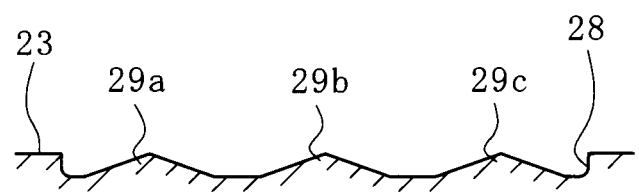
FIG. 6 is a partial cross-sectional view showing a circumferential groove shown in FIG. 5.

Although the ridges 29 are formed in a row in the circumferential groove 28 in the above-mentioned embodiment, the ridges 29 may be formed in plural rows. For example, as shown in FIG. 5 and FIG. 6, ridges 29a, 29b, 29c may be formed in three rows in a circumferential groove 28. The respective ridges 29a, 29b, 29c are formed such that width sizes of the ridges 29a, 29b, 29c are gradually narrowed from one end side (stepping-in side) to the other end side (kicking-out side) in the tire circumferential direction and the ridges 29a, 29b, 29c are formed to be inclined with respect to the tire circumferential direction.

Figure 7:
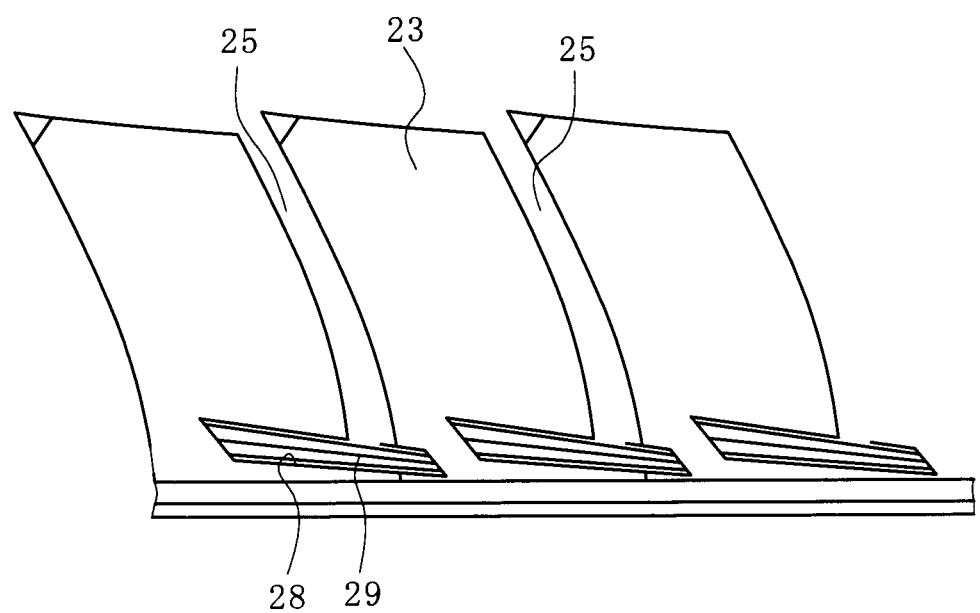
FIG. 7 is a partial enlarged view of a shoulder portion according to another embodiment.
Figure 8:
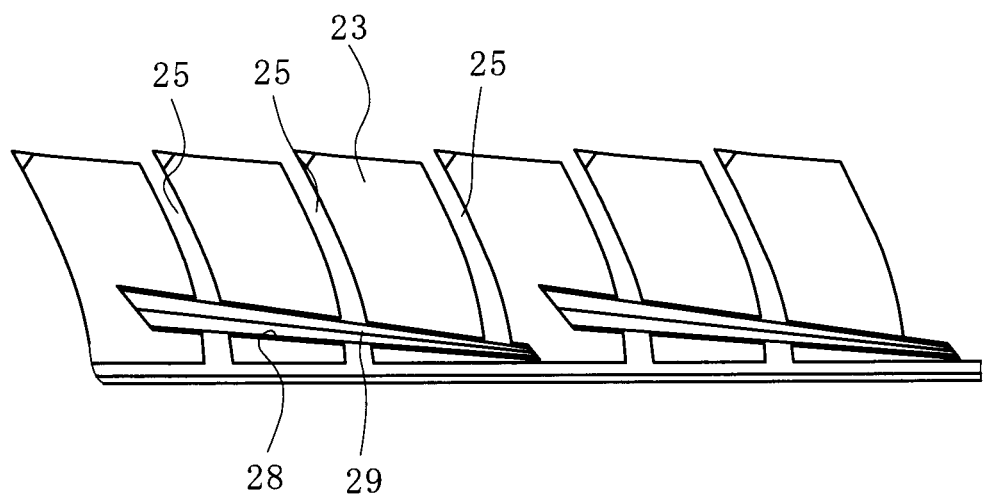
FIG. 8 is a partial enlarged view of a shoulder portion according to another embodiment.

In the embodiment, one ridge 28 is formed so as to be connected to three shoulder blocks 23 straddling over two second lateral grooves 25. However, the ridge 28 may be formed as follows. FIG. 7 shows the case where one ridge 28 is formed so as to be connected to two shoulder blocks 23 by way of one second lateral groove 25. FIG. 8 shows the case where one ridge 28 is formed so as to be connected to four shoulder blocks 23 straddling over three second lateral grooves 25.

Figure 4:
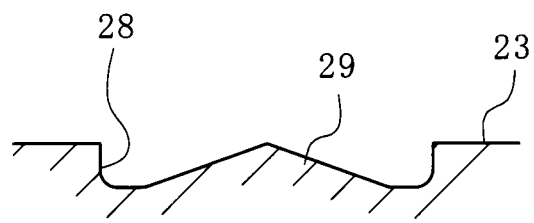
FIG. 4 is a partial cross-sectional view showing a circumferential groove shown in FIG. 3.
Figure 9A:
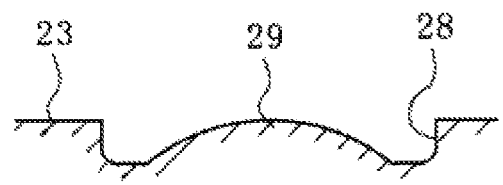
FIG. 9a to FIG. 9d are partial cross-sectional views showing circumferential grooves and ridges according to other embodiments.
Figure 9B:
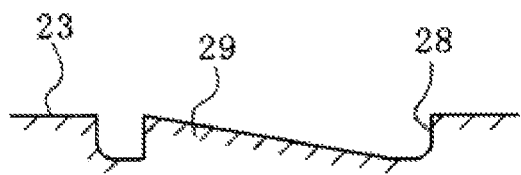
Figure 9C:
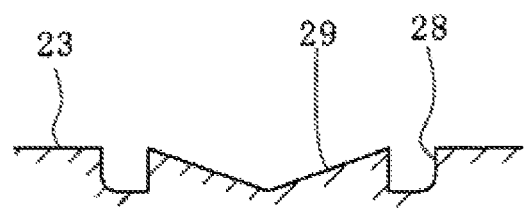
Figure 9D:
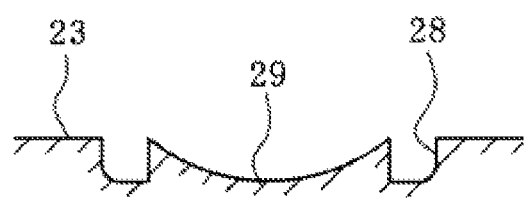

Although the circumferential groove 28 has the cross-sectional shape shown in FIG. 4 in the above-mentioned embodiment, the circumferential groove 28 may have a cross-sectional shapes as shown in FIG. 9a to FIG. 9d. In FIG. 9a, a ridge 29 has a cross-sectional shape projecting in an arcuate shape. In FIG. 9b, a ridge 29 has a cross-sectional shape where the ridge 29 has a single inclined surface which is inclined from one side to the other side. Accordingly, a recess formed in a circumferential groove 28 becomes imbalanced between left and right sides. In FIG. 9c, a ridge 29 has a cross-sectional shape where a center portion is indented in a V shape. In FIG. 9d, a ridge 29 has a cross-sectional shape where a center portion is indented in an arcuate shape.

What is claimed is:

1. A pneumatic tire comprising:
    a buttress portion;
    a plurality of shoulder blocks formed on the buttress portion by lateral grooves extending in the tire width direction;
    a plurality of circumferential grooves formed on the buttress portion of a front surface of the plurality of shoulder blocks, the front surface directing outwardly in a tire radial direction, and extending in a tire circumferential direction; and
    a ridge extending in the tire circumferential direction formed in each of the plurality of circumferential grooves,
    wherein a length of the ridge is not smaller than 50% of a length of the circumferential groove in the tire circumferential direction, and
    wherein the ridge is inclined with respect to the tire circumferential direction, and the ridge is formed over at least the lateral grooves disposed next to each other in the tire circumferential direction.

2. The pneumatic tire according to claim 1, wherein the ridges have no overlapping region in a state where the ridges are projected in a tire width direction.

3. The pneumatic tire according to claim 2, wherein the ridge has a triangular shape in cross section, and an apex of the triangular cross section is positioned coplanar with a surface of the buttress portion.

4. The pneumatic tire according to claim 1, wherein the ridges have different transverse cross-sectional areas in the tire circumferential direction.

5. The pneumatic tire according to claim 1, wherein the ridge has a triangular shape in cross section, and an apex of the triangular cross section is positioned coplanar with a surface of the buttress portion.

* * * * *